Aug. 28, 1928.
H. G. SCHWARZ
CLARIFIER AND THICKENER
Filed March 23, 1926
1,682,256
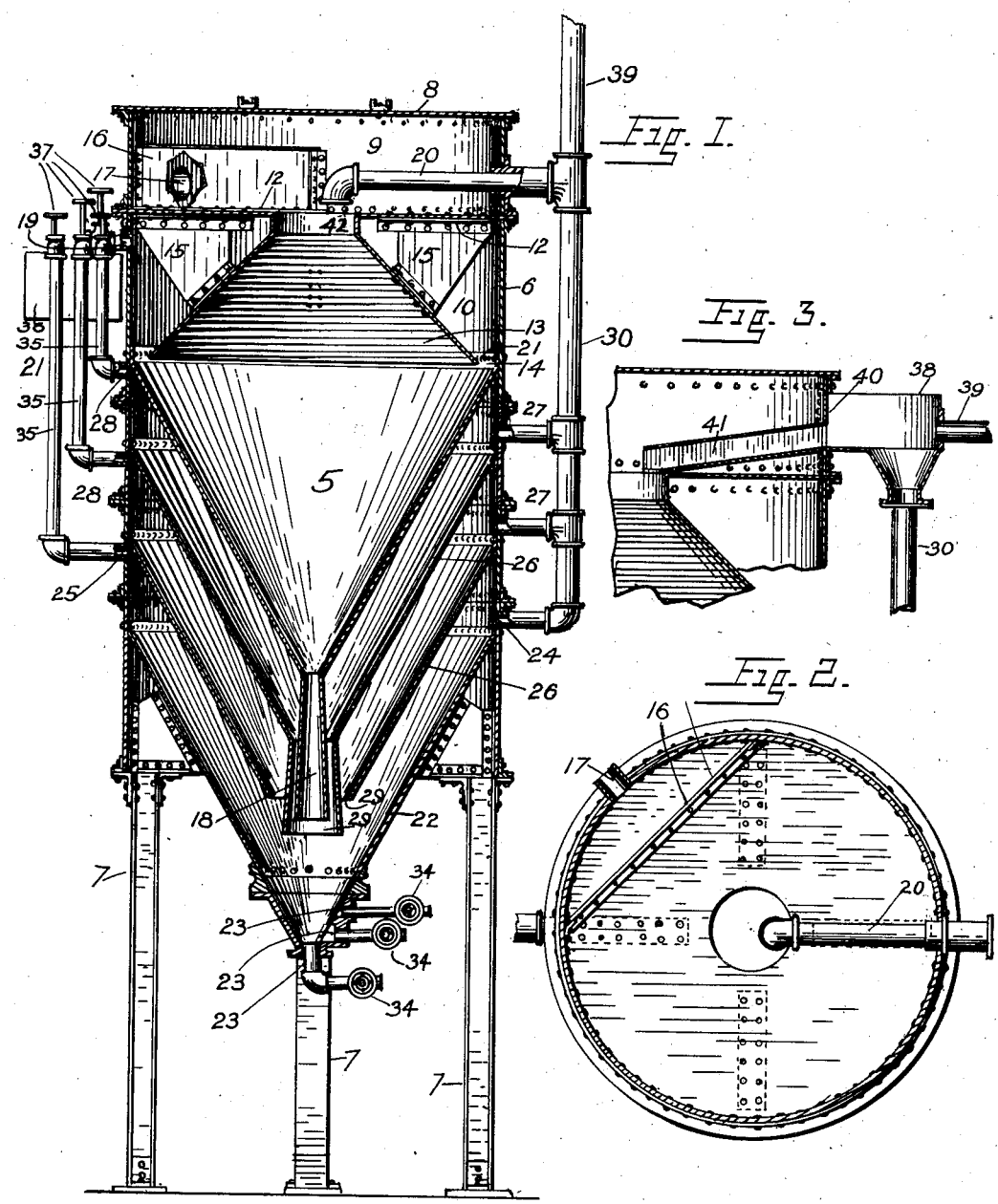
INVENTOR.
H. G. Schwarz.
BY
ATTORNEY.

Patented Aug. 28, 1928.

1,682,256

UNITED STATES PATENT OFFICE.

HENRY G. SCHWARZ, OF DENVER, COLORADO.

CLARIFIER AND THICKENER.

Application filed March 23, 1926. Serial No. 96,713.

This invention relates to clarifiers and thickeners used in separating solids from liquids in liquid suspensions, and it is an object of the invention to provide a simple apparatus requiring but little floor space in ratio to its capacity, in which a clean separation of solids out of liquid is rapidly effected by a settling action without the use of scrapers, rakes or other mechanical means.

A further object of the invention is to provide an apparatus of the above described character comprising an association of separately operating settling units the number of which may be varied according to the nature of the material under treatment; another object is to provide an arrangement of settling units which irrespective of their number, are all comprised within the floor space occupied by a single unit and still other objects reside in details of construction and combinations of parts as will be clearly brought out in the following description with reference to the accompanying drawings.

My invention is particularly adapted for removing sugar lime from waste waters obtained by the Steffens molasses desugarizing process in sugar factories or to separate sugar juices from lime sludge in lime carbonated liquids of the carbonation system and it provides, generally, an economical and efficient substitute for filter presses and mechanical thickeners used heretofore for similar purposes.

Other purposes for which the invention may be employed to marked advantage, are the separation of the clear sugar juice from limed pineapple juice or the clarification of cane juices, metallurgical slimes and other materials of similar nature.

In any of the uses above enumerated, the improved clarifier is distinguished by the production of an overflow of sparkling clearness in a rapid and efficient settling action obtained at a minimum cost of operation and installation and without the expert attention required in devices of similar type employing power driven mechanisms for the removal of settled solids.

In the drawings in the two views of which corresponding parts are similarly designated Figure 1, represents a vertical sectional elevation of a clarifier and thickener of the multi-unit type constructed in accordance with my invention;

Figure 2, a horizontal section taken in the plane indicated by the line 2—2 in Figure 1, and Figure 3, a fragmentary section of the upper part of the apparatus, showing a modification of the means for feeding material thereto.

The primary or master unit of the apparatus which under certain conditions may singly produce the desired result, comprises a funnel-shaped or inverted cone shaped settling chamber 5 fixed at its upper end within a cylindrical shell 6 supported in an upright position on legs 7.

The portion of the shell above the cone shaped chamber may be closed at its top by a cover plate 8 and it is divided into two compartments 9 and 10 by a horizontal partition 12.

The partition has a central opening in connection with an opening 42 at the apex of a conical hood 13 which extends over the settling chamber with its lower edge in spaced relation to the rim 14 by which the chamber adjoins the cylindrical shell. The hood 13 is rigidly suspended from the partition 12 by gussets 15.

The upper compartment 9 of the shell has an overflow weir 16 for the separation of scum and other extraneous matter on the surface of liquid rising in the compartment through the opening of the partition, said matter being discharged from the compartment by an outlet 17.

The settling chamber 5 has at its lower end, an outlet 18 for settled matter and the compartment 10 which constitutes the zone of clarified liquid has an overflow opening 19 immediately below the partition 12.

In the operation of the apparatus as described so far, the material is fed into the opening of the hood through a conduit 20. The material thus centrally introduced into the hood spreads to the circumference thereof and enters the settling zone provided by the chamber 5 in a downwardly directed current.

The solids in the downwardly moving material continue their downward course and are directed by the tapering wall of the funnel shaped container to concentrate to the lower portion thereof for their ultimate discharge through the outlet 18.

The liquid in the material rises through the space 21 between the cones 5 and 13 into the overflow chamber 10, so that the liquid discharged through the outlet 19 is of sparkling clearness.

The matter in the material lighter than the liquid, passes upwardly into the separating compartment 9 in which it moves across the overflow weir 16 and out of the compartment through the opening 17.

The solids discharged at the lower end of the settling chamber, pass into an inverted cone shaped receiver 22, fixed at its rim within the cylindrical shell, below the chamber. The receiver has at its lower end one or more outlets 23 the flow through which is controlled by valves 34.

By proper regulation of these valves, the discharge of solids may be controlled to any desired degree, thereby regulating the operation of the apparatus to automatically produce a clean separation of the solids and liquid contained in the material under treatment without the use of mechanical appliances and without the expert attention required in other apparatus heretofore employed for similar purposes.

The distance between the axis of the containers 5 and 13 at which the feed enters, and the circumference of the same at which the liquid passes upwardly through the annular space 21 into the zone 10 constitutes the flow line which determines the time period of initial separation before the liquid reaches the point of segregation provided by the space around the hood.

The receiver 22 may be made to function as a supplemental settling unit by providing the space above the same with an inlet 24 for fresh material and with an overflow outlet 25 at substantially diametrically opposite points.

It is desirable that the overflow be at the highest point above the cone shaped tank that constitutes the supplemental settling chamber, and at a point higher than the inlet so that the liquid in the material entering the supplemental chamber, must move to the overflow outlet out of the solids which are directed by the sloping wall of the chamber to settle to the bottom thereof.

By arranging other cone shaped tanks 26 between the tank 5 of the master unit and the receiving tank 22, each having a bottom outlet 29 opening in the receiving tank and by providing each tank with an inlet 27 and an overflow outlet 28 arranged similarly to those of the receiving tank hereinbefore described, the apparatus may be constructed to provide as many settling units as may be desired to increase its capacity and efficiency.

When, as in the construction illustrated in the drawing, all the units have outlets at their lower ends, open in the receiving tank, they will co-operate in obtaining a clean separation of solids in liquid while the operation of all the units may be regulated by the valves 34 of the lowest unit.

The feed conduit 20 of the primary settling unit and the inlets 24 and 27 of the other units may be connected with the outlet conduit 39 of the source of supply by a common header 30 and the various overflow outlets of the units may be connected to pipes 35 extended upwardly to discharge their issues into a tank 36. The pipes 35 and the outlet 19 of the upper settling unit, are provided with valves 37, which provide a convenient means to control the overflow from the various settling units so that nothing but clear liquid will enter the tank 36.

The method of feeding the material to the settling units, illustrated in Figure 1 of the drawings is satisfactory for all materials having heavy solids only, without matter lighter than liquid. If, however, the material contains lighter matter capable of rising in the liquid and of forming a scum at the surface thereof, it is desirable to provide means for the removal of the scum before the material enters the settling units. A simple and practical means of this character has been shown in Figure 3, in which 38 designates a separating box interposed between the pipe 39 through which the material passes from the source of supply to the apparatus, and the feed opening 40 through which in the construction of Figure 1, the feed pipe 20 extends.

A spout or conduit 41 slants from the lower portion of the opening 40 to the inlet 42 at the upper end of the dome 13, so that the opening is divided into two sections one above the other, the lower one of which provides a passage for liquid and heavy solids to the inlet of the settling unit while the upper one serves to separately conduct the upper part of the liquid together with the scum into the chamber 9 from which the scum is discharged over the overflow weir 16 as heretofore described. The box 38 has an outlet in its bottom connecting with the conduit 30 when the apparatus includes more than one settling tank as illustrated in Figure 1.

Having thus described my invention what I claim and desire to secure by Letters Patent is:—

1. Apparatus of the character described comprising an upright shell, a funnel shaped settling chamber in the shell, having a bottom outlet for settling solids, a hood spaced from the wall of the chamber to provide a passage for rising liquid and having a central feed opening, a partition around the feed opening of the hood, dividing the shell into upper and lower compartments each having an outlet, and a weir in the upper compartment for the passage of floating matter to the outlet in the upper compartment.

2. Apparatus of the character described comprising a primary settling unit defined by a funnel shaped tank and having a bottom outlet for settling solids and a passage for rising liquid, and a second funnel shaped tank spaced from the other to provide a supplemental settling unit in connection with the bottom outlet of the primary unit, the supplemental unit having in its upper portion an inlet and an overflow outlet at different elevations and at its lower end, an outlet for settling solids.

3. Apparatus of the character described comprising an upright shell, and funnel shaped tanks in the shell, spaced from each other to provide a plurality of settling units each tank having a bottom outlet for settling solids and each unit having in its upper portion an inlet for material above the bottom outlet of the next inner tank and an overflow outlet for rising liquid.

4. Apparatus of the character described comprising an upright shell, and upper funnel shaped tank in the shell defining a primary settling unit, funnel shaped tanks in the shell spaced from each other and from the upper tank to provide supplemental settling units, each tank having an outlet for settling solids at its lower end, a hood spaced from the circumference of the upper tank to provide a passage for rising liquid into the portion of the shell around the hood, said portion of the shell having an outlet for liquid, and means to feed material into the hood, the supplemental settling units each having an inlet apart from the outlet of an adjacent tank and, at higher elevation an overflow outlet for liquid.

5. Apparatus of the character described, comprising a plurality of cone-shaped settling tanks each having a bottom outlet for settling solids and each having in its upper portion an inlet for material and, at a higher elevaton, an overflow outlet for clear liquid, valves regulating the liquid discharge from the overflow outlets, a source of supply, and means to conduct material from the source to the inlets of the settling units simultaneously.

6. Apparatus of the character described, comprising a cone-shaped settling unit having a bottom outlet for settling solids, and in its upper portion, an intake for material and, at a higher elevation, an overflow outlet, a separating chamber having an overflow outlet for scum, a source of supply, and means to conduct material from the source, including a box having an opening divided into an upper section connecting with the separating chamber, and a lower section separately connected with the intake of the settling chamber.

7. Apparatus of the character described, comprising cone-shaped settling units each having a bottom outlet for settling solids and each having in its upper portion an intake for material and, at a higher elevation, an overflow outlet, a separating chamber for scum, a source of supply, and means to conduct material from the source, including a box having outlets connecting with the intakes of the settling chambers and above said outlets, an outlet connecting with the separating chamber.

8. Apparatus of the character described, comprising cone-shaped settlings tanks spaced from each other in axial alinement, each having a bottom outlet for settling solids and each having in its upper portion, an intake apart from the outlet of the adjacent tank and, at a higher elevation, an overflow outlet, and a source of supply connected with the intakes of the units for the simultaneous supply of material thereto.

9. Apparatus of the character described comprising a primary settling unit defined by a funnel-shaped tank and having in its bottom an outlet for settling solids and in its upper portion, an outlet for rising liquid, means for feeding material into the unit, and a plurality of funnel shaped tanks spaced from each other and from the tank of the primary unit to provide supplementary settling units, each supplemental unit having at its lower end an outlet for settling solids, and in its upper portion an inlet above the outlet of the next inner tank and, at a higher elevation, an overflow outlet.

In testimony whereof, I hereunto affix my signature.

HENRY G. SCHWARZ.